United States Patent [19]
Norman

[11] 3,877,237
[45] Apr. 15, 1975

[54] UNDERWATER TRENCHING APPARATUS GUIDANCE SYSTEM

[75] Inventor: Robert M. Norman, Lafayette, La.

[73] Assignee: Norman Offshore Services, Inc., New Orleans, La.

[22] Filed: Aug. 1, 1973

[21] Appl. No.: 384,886

Related U.S. Application Data

[62] Division of Ser. No. 175,448, Aug. 27, 1971, abandoned.

[52] U.S. Cl. .................................................. 61/72.4
[51] Int. Cl. .......... E02f 5/02; E02f 5/14; F16l 1/00
[58] Field of Search .......... 64/72.4, 72.1; 37/54, 63, 37/64, 65

[56] References Cited
UNITED STATES PATENTS

| | | |
|---|---|---|
| 3,338,059 | 8/1967 | Tittle .................................. 61/72.4 |
| 3,429,132 | 2/1969 | Martin ................................. 61/72.4 |
| 3,434,297 | 3/1969 | Gretter et al. ......................... 61/72.4 |
| 3,670,514 | 6/1972 | Breston et al......................... 61/72.4 |

*Primary Examiner*—Jacob Shapiro
*Attorney, Agent, or Firm*—Mason, Fenwick & Lawrence

[57] ABSTRACT

An underwater self-propelled buoyant trenching apparatus for burying a pipeline or cable on the bottom of a body of water. Water jets on a frame cut the trench. The apparatus is motivated by a drive roller that is resiliently urged against the pipeline. Forward guide rollers positioned ahead of the water jets sense the pipeline direction and act to torque the apparatus onto the centerline of the pipeline.

18 Claims, 9 Drawing Figures

Fig-2

UNDERWATER TRENCHING APPARATUS GUIDANCE SYSTEM

This application is a division of copending application Ser. No. 175,448, filed Aug. 27, 1971 now abandoned.

This invention relates generally to a self-propelled underwater trenching apparatus. More particularly, the present invention is concerned with a self-propelled, underwater bouyant apparatus for burying pipelines or cables laid on the floor of a body of water and to the guidance system for maintaining the apparatus aligned with the pipeline.

Apparatus for burying pipeline cable and the like have been well known in the art for many years. Essentially, they incorporate some means for jetting water in advance of the movement of the apparatus to dig and cut away a trench into which the pipeline is to rest. Most previous apparatus utilize the pipeline as the guiding means for directing the apparatus in an effort to assure the positioning of the center line of the trench to be coincident with the axis of the pipe. There usually is far less difficulty when the pipeline laying on the bottom of the body of water is in a straight line, but a serious problem occurs when the pipeline is curved.

The pipeline may be laid in a straight line and therefore presumed to remain in a uni-direction so that the trenching apparatus may easily follow and bury the pipeline but underwater current or other disturbances that may for instance be caused by storms vary the direction of the pipeline, often forming them into tight curves or even loops. Such abrupt changes in direction of the pipeline will not permit the apparatus to be steered quickly enough to the new direction and the water jets will tend to continue along the straight path to cut a straight rather than curved trench. The result is that the pipeline is not centerlined with the trench.

The articulated trenching apparatus disclosed in Henry U.S. Pat. No. 3,576,111 is an attempt to overcome this problem, but the front rollers in this patented apparatus would not engage any curvature in the pipe until the cutting heads cleared a path well ahead and straight in front of the apparatus. The failure of this apparatus to be quickly sensitive to the curvature results in an off-line pipeline trench.

Even if the bottom is relatively level and the pipeline in a desired direction, obstacles often are found on the bottom which obstruct the forward movement of the apparatus as it is guided along the pipe. In most instances, the trenching apparatus known in the art requires a diver to be a hand if not riding upon the apparatus to remove such obstacles and prevent damage to the pipe or the apparatus. The requirement of the presence of the diver is not only added expense, but an inefficient method of detecting obstacles since the diver's vision is seriously limited by reason of the bottom cuttings being cast up upon the apparatus as well as the lack of light at the usual depth. A substantially self-sufficient trenching apparatus would avoid the frequency of diver inspection.

While guidance along the pipeline is logical and in most cases an effective method of directing the trenching apparatus, the pipeline is frequently not smooth, either due to cable slings permitted to remain on the line or because of various cathodic protection devices secured to the pipeline to prevent corrosion. These irregularities have in the past prevented guide rollers from passing over such irregularities. If the means of propulsion is a drive roller such drive roller often wears away the corrosion-resisting coating on the pipe as it attempts to pass over the irregularity. In any event, the stoppage requires the immediate attention of the diver who usually must disassemble the apparatus from the pipe so that it can pass over the irregularity. Substantial loss in time and efficiency inherently occurs.

Various prior art attempts have been made to remove the cuttings from the area beneath the pipe. Eductor tubes as disclosed in Elliott U.S. Pat. No. 3,368,358 have some effectiveness but the placement of the water delivery pipes down at the mouth of the eductor tube creates a clogging with cables and metal objects or rocks found in or on the bottom. The minimum number projections upon which debris can be held is important to a longer continuous and efficient operation.

Numerous other problems arise in an effort to provide a self-propelled underwater trenching apparatus for burying pipeline and the like which requires the minimum amount of attention by the diver and maximum control in the supervising barge or ship. In order to provide a provide a properly functioning trenching and burying apparatus having these characteristics, the attitude of the apparatus is of great importance to assure that it proceeds in the desired course. Means for effecting bouyancy and attempts to control the attitude of the apparatus have been utilized with limited success in the past.

Also of great importance is the requirement that no damage be caused to the pipeline or to its protective coating. When the apparatus is of great weight as is usually true of prior art apparatus the pipeline and coating are frequently found to be scraped or marked. Lighter weight apparatus would be desirable provided they are capable of withstanding the very high pressures that may for instance exceed 1,000 psi.

The hoses that supply the air and water utilized by the apparatus to provide the trench are often times a serious problem due to the constant chafing of one hose upon the other or the tie lines of a float or buoy. It has been conventional to tie a can or buoy to the bundle of hoses or else maintain the hose bundle in a raised position by a crane or other device to be certain of its position. None of these approaches has been found successful since there is still abnormal wear of the hoses. Further, bad weather necessitates their detachment from the apparatus. It, of course, would be desirable to detach the hoses at the barge rather than either detach the buoy at some distance from the barge or at the trenching apparatus, either of which brings about further inefficiencies in the pipeline burying operation.

Accordingly, it is the object of the present invention to provide a buoyant, self-propelled underwater trenching apparatus for burying pipelines, cables or the like which is efficient and effective in operation and can be substantially completely controlled on the water surface.

It is also an object of the present invention to provide buoyant underwater self-propelled trenching apparatus utilizing drive rollers for primary propulsion which are resiliently mounted in order to be able to pass over irregularities in the circumference of the pipe.

Another object of the present invention is to provide a buoyant underwater self-propelled trenching apparatus for burying pipelines that is guided by the pipeline and can quickly follow relatively sharp pipeline turns, frequently encountered in a pipeline laying on the bottom of water so as to direct the cutting jets to dig a curved trench in accordance with the centerline of the pipeline.

Another object of the present invention is to provide a buoyant self-propelled underwater trenching apparatus for burying pipelines in which a venturi operated eductor means is included to remove the cuttings and debris produced by the jetting action of the nozzles and to discharge these cuttings to the side of the apparatus with a minimum possibility of clogging.

This invention also has as an object the provision of the cutting jets in rows and individual angled positions which minimize the undesirable rearward thrust and also maximizes the effectiveness of the cutting operation.

This invention has yet another object to provide an effective method of assurring a correct attitude of the apparatus as it passes along the pipeline through the use of a compartmented buoyancy tank and also provides for the minimum weight impressed upon the pipeline resulting in less likelihood of pipeline damage.

Yet another object of the present invention is the provision of a simple and effective means for support of the hose bundle delivering water and air from the water surface to the apparatus to avoid drag and chaffing created by water movement.

These and other objects of the present invention shall become more apparent upon careful study of the following detailed description in the claims including drawings in which:

GENERAL DESCRIPTION

Figure 1:
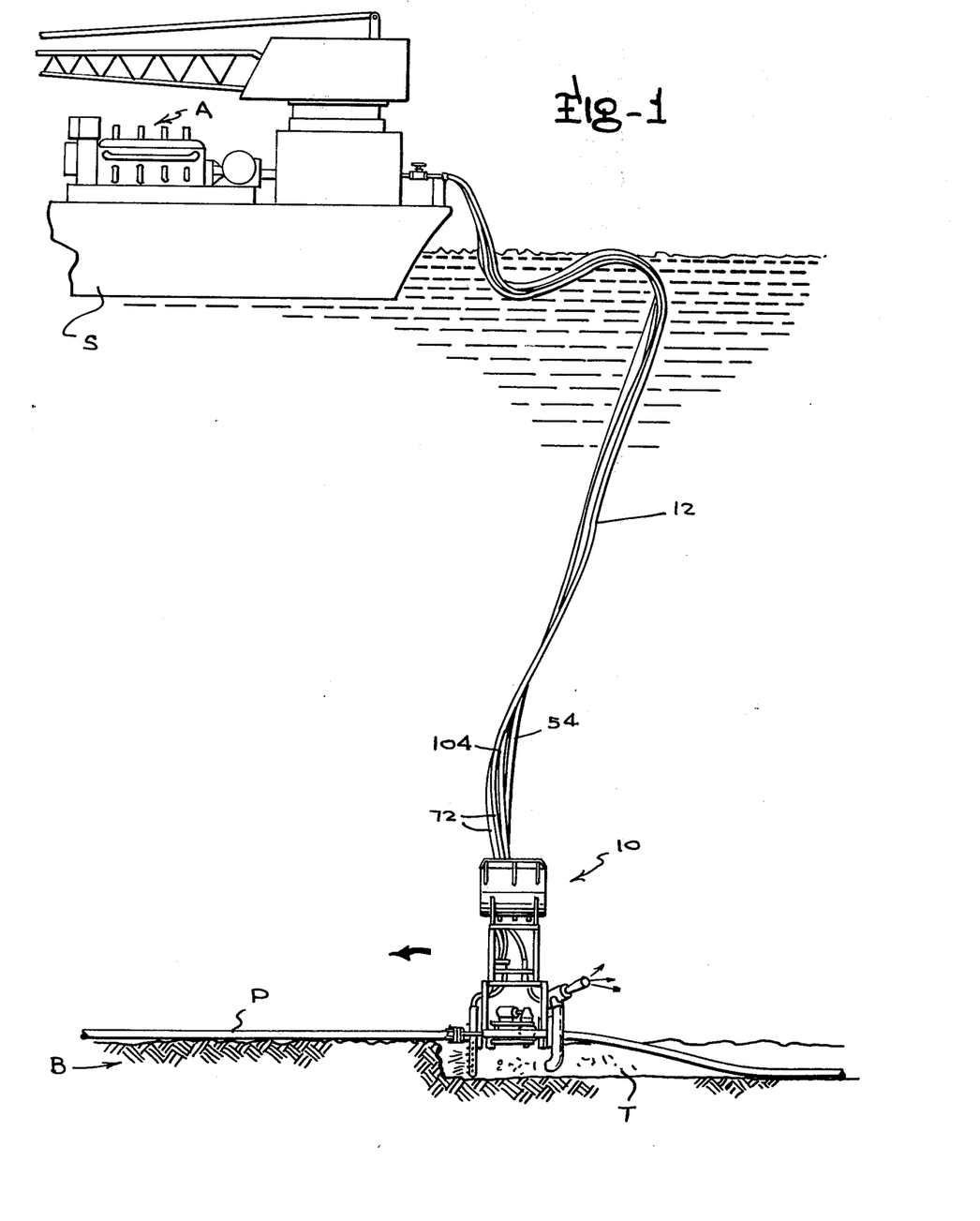
FIG. 1 is an overall view of the buoyant self-propelled underwater trenching apparatus of the present invention illustrating the relationship between the barge and the apparatus contacting the pipeline on the bottom of the body of water.
Figure 2:
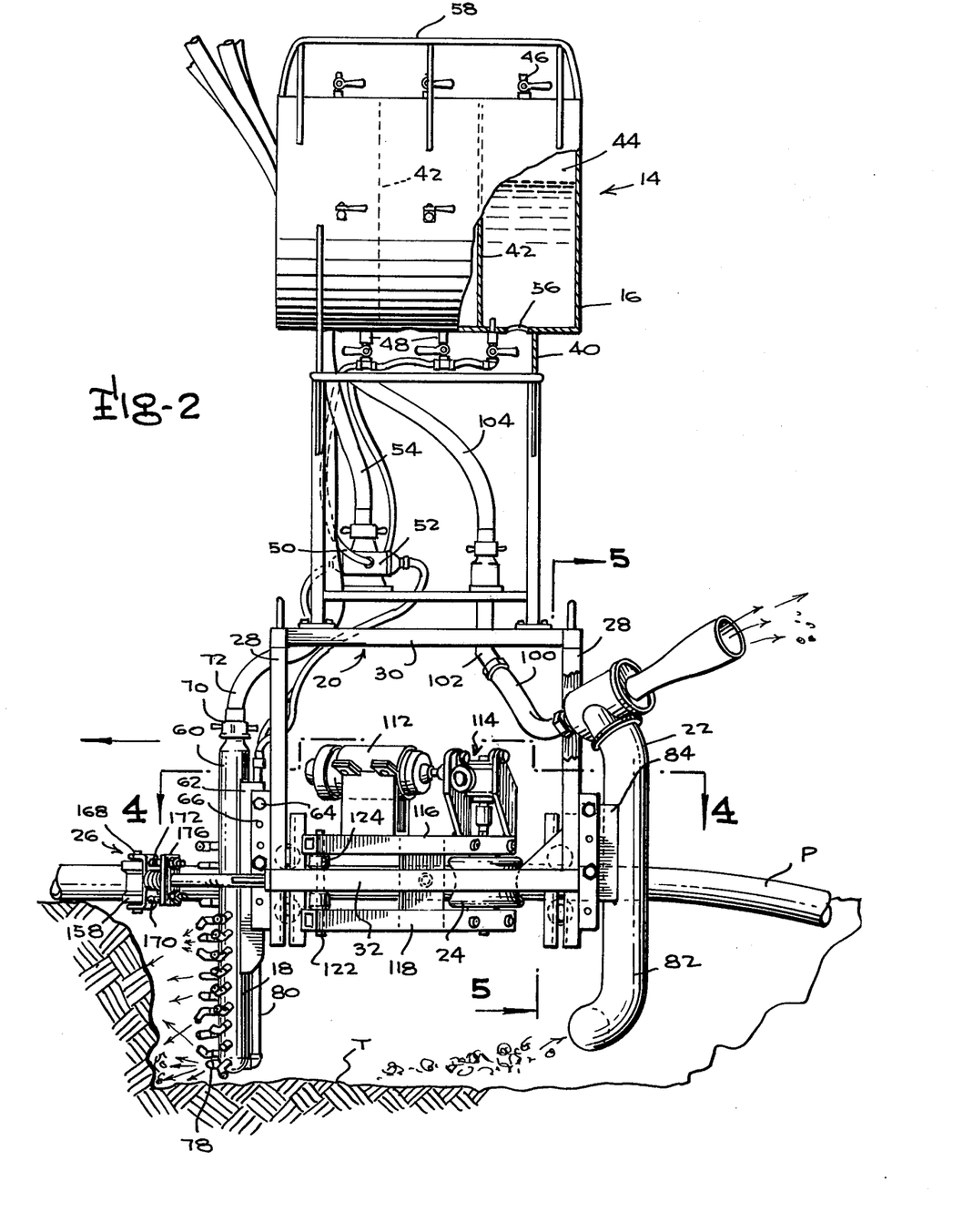
FIG. 2 is a side elevational view partly broken away illustrating the compartmented buoyancy tanks, the drive rollers and forward rollers as well as the jet means for cutting away the bottom formation and the eductor means for discharging the cuttings.
Figure 3:
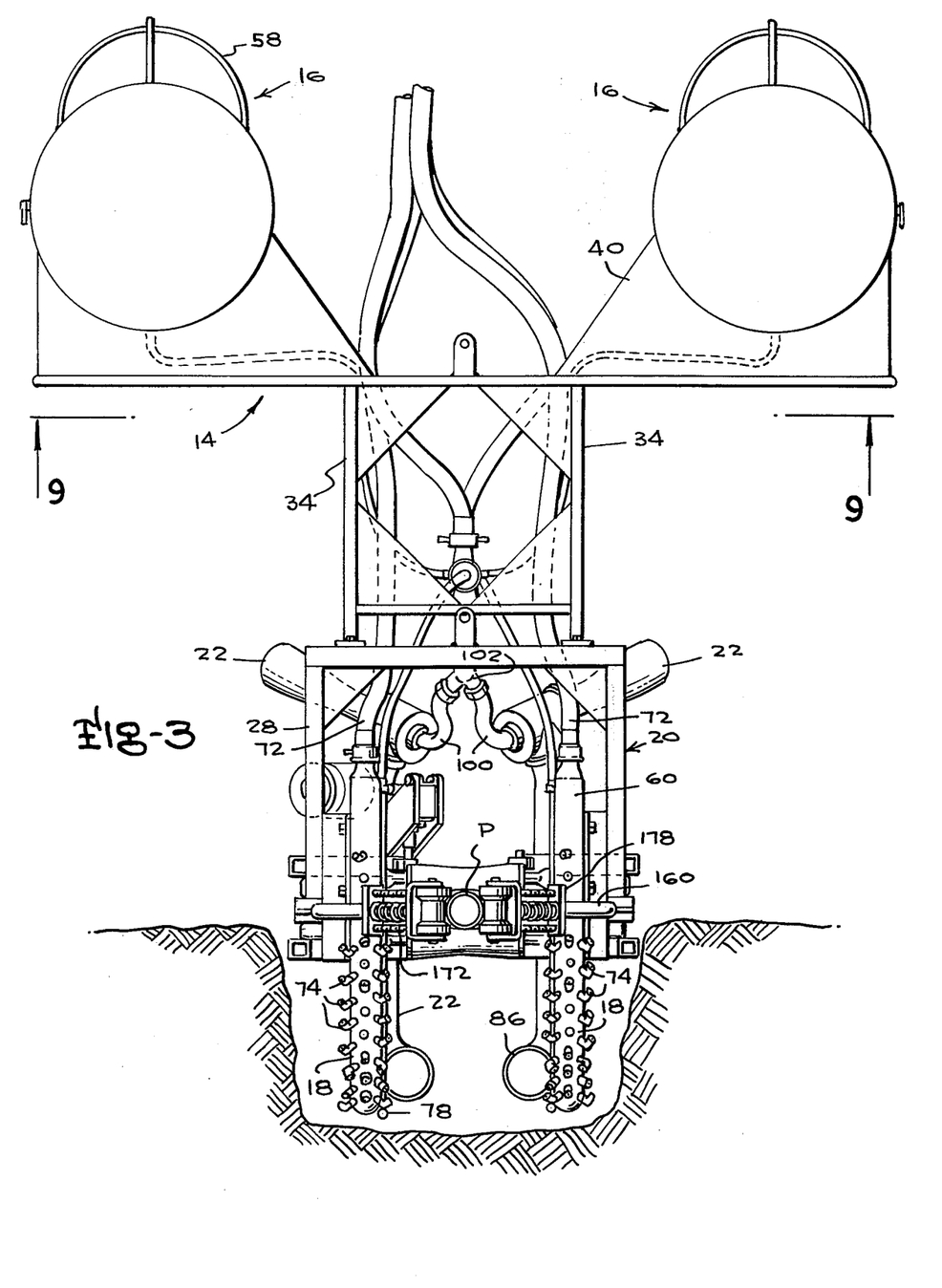
FIG. 3 is a front elevational view best illustrating the position of the jet means for cutting and formation and the relative position of the eductor means as well as the forward guide rollers in contact with the pipeline.

FIGS. 1, 2 and 3 of the drawing disclose generally the buoyant underwater self-propelled trenching apparatus 10 constituting the present invention. The apparatus is guided along pipe P to be buried in the trench T formed by the apparatus. The apparatus 10 proceeds in the direction of the arrow shown in FIG. 1 along the pipeline P that has been previously laid on the bottom B of the body of water. Connected to the apparatus 10 by means of various air and water hoses 12 is the pumping apparatus A positioned on barge or ship S.

Referring principally to drawings FIGS. 2 and 3 the buoyant underwater self-propelled trenching apparatus of the present invention is composed of several elements. The buoyancy apparatus shown generally at 14 is composed of a pair of buoyancy tanks 16 which are identical. The apparatus surrounding the pipeline P includes the jet means 18 for cutting the trench and is positioned on either side of the pipe and secured towards the forward end of the apparatus onto frame 20. Eductor means 22 extends from its mouth at the bottom of the apparatus to the angled discharge end is supported on the aft end of the frame. Propulsion of the apparatus 10 is achieved from drive rollers means 24. Forward guide rollers means 26 positioned in front of the jet means 18 and in contact with the pipeline P enables the apparatus 10 to be sensitive to changes in direction of the pipeline P and shift the apparatus accordingly.

FRAME STRUCTURE

The structure of the trenching apparatus 10 is composed basically of a frame 20 formed from inverted U-shaped sealed square tubing 28 positioned fore and aft in the apparatus. Joined at the corners of the U are a pair of parallel longitudinal square tubular members 30 to be positioned on each side of the pipeline P in working position as may be seen in FIG. 2. At the bottom of the legs of the U lower longitudinal members 32 similar to 30 are secured. Mounted on top of the frame 20 are vertical supporting members 34 which are four in number and which are supported on cross struts 36 shown in FIG. 5. Supported on the members 34 is an outrigger carriage 38 to which are attached the buoyancy tanks 16 being held in place by cradle struts 40 securing each of the buoyancy tanks to the side of the apparatus 10 as best shown in FIG. 3.

BUOYANCY AND ATTITUDE CORRECTION MECHANISM

The buoyancy tanks 16 are made of rigid material and are compartmented by partition 42 into three separate noncommunicating compartments 44. The level of the water in each compartment is controlled by air outlet valves 46 at the top of the buoyancy tank and air inlet valves 48 positioned in the bottom of the tanks and connected by suitable hose 50 to the header 52 supplied with air by air supply hose 54. Also at the bottom of each tank is an opening 56 which permits water to enter and be discharged in accordance with the operation of the air pressure supplied by the air inlet valves 48 and air outlet valves 46. Protective bars 58 are secured to the upper end of the buoyancy tanks to protect against damage to the air outlet valves 46.

The compartments in each of the tanks will readily fill with water upon submersion of the apparatus provided the air outlet valves 46 are open. After the compartments or any one of them are filled there would be no buoyant effect from that compartment until water is pumped out of any one of the compartments. Since there are provided tanks on either side of the pipe P and tanks are positioned on the vertical centerline of the apparatus as best shown in FIG. 2, it should be obvious that the attitude of the apparatus can be varied in accordance with the amount of air in any one of the compartments. By emptying the forward compartments in both of the tanks the apparatus is tilted upwardly. By unbalancing the buoyant effect on either the left or the right buoyancy tank the attitude of the apparatus may be tilted to the left or to the right in a manner that should be obvious.

THE FORMATION CUTTING JET MEANS

The jet means 18 on either side of the pipeline P as may be best seen in FIGS. 2 and 3 is formed from high pressure tubing 60 to form a cutting head. To the cutting head is welded a multiholed bolting frame or fishback 62 secured as by bolts 64 to a complementary frame fishback 66 welded to channel bar 68. The fishback 66 and the bar 68 are welded to the frame 20 and longitudinal tubualr member 30. Each of the fishbacks 62 are long enough to permit the mounting of an additional superposed tubular cutting head 60 which simply may be secured to the lower cutting head through the use of a hammer fitting 70. The uppermost cutting tube 60 fluidly communicates with high pressure water hose 72. It has been found to be desirable to provide each cutting tube 60 with its own water hose 72.

The forward face of the cutting tube 60 forming the jet means 18 is provided with a plurality of jet nozzles 74. Each of the jet nozzles may be provided with various angles that may range from 30°–90° as shown by the nozzle angle in FIG. 8. The nozzles 74 are suitably secured to nozzle adaptors which communicate to the interior of the tube 60.

As best shown in FIG. 3 the nozzles 74 are positioned on the tube 60 in three vertical rows. To minimize the rearward thrust provided by the reaction to the water jetting from the jet nozzles 74 each nozzle is positioned to offset as much as possible the tilting, turning or reverse thrust produced by the jet nozzles. For every nozzle that is pointed at any particular angle downwardly or upwardly and inwardly or outwardly relative to the centerline of the pipeline there is a complementary jet nozzle 74 on the opposite tubular member 60 to offset the torquing effect. The nozzles are also directed to avoid direct contact of the water jets with the pipe and the forward guide roller means. Due to the advanced position of the forward guide roller means the upper jet nozzles are directed to spray a water jet well in front of the forward guide roller means to limit obstruction to the movement of the apparatus.

To assist the cutting action of the jet means 18 there is preferably provided an air nozzle 78 secured to the bottom of cutting heat 60 and which is fed through air pipe 80 connected to air supply header 52. The purpose of the air discharge adjacent the bottom of the cutting tube 60 is to give a floatation effect to the bottom cuttings dislodged by the jet means 18 from the bottom B. Through the use of the air jet the cuttings tend to be buoyed upwardly more quickly and carried away or to the side of the apparatus. The cuttings not so removed are sucked up and discharged by the eductors 22.

THE EDUCTORS AND CUTTINGS DISCHARGE

Secured to the frame 28 in a manner similar to that of the cutting tubes 60 are the educators 22. They are formed from tubes 82 to which is welded fishback 84 secured to complementary fishback 86 welded to the frame 20.

Figures 6, 7, 8:
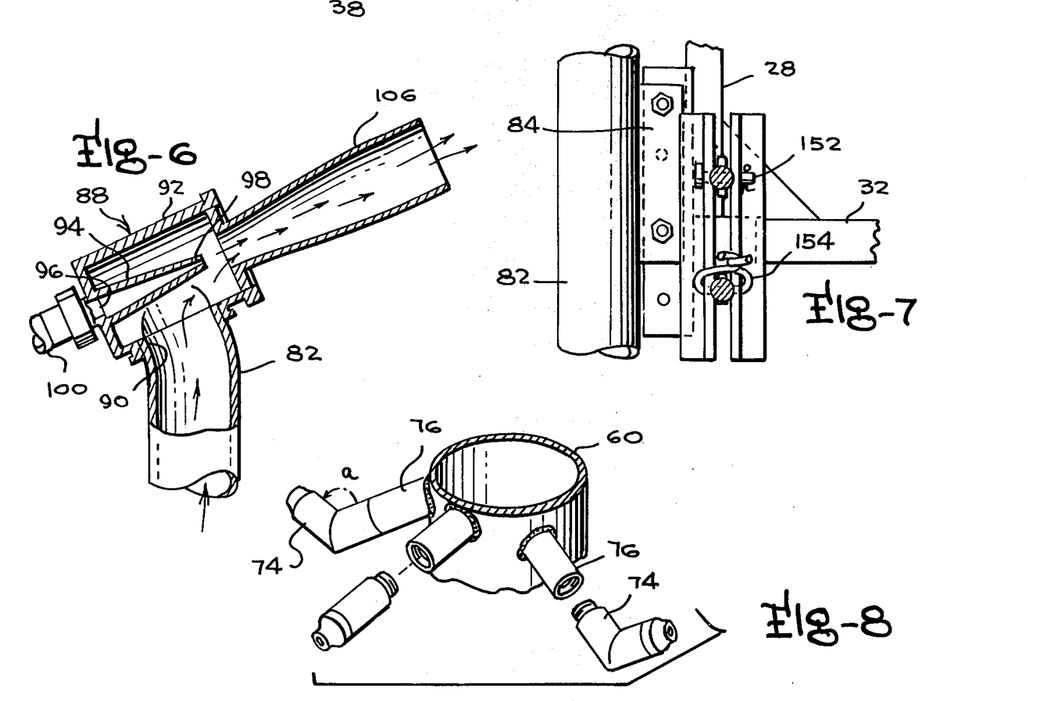
FIG. 6 is a cross-sectional view of the venturi in the eductor means as viewed along lines 6—6 of FIG. 5.
FIG. 7 is a cross-sectional view taken along lines 7—7 of the mounting of the elongated rollers for supporting the apparatus along the pipeline and also illustrating the shear pin means supporting the bottom roller.
FIG. 8 is a cross-sectional view of the cutting head illustrating the various positions of the cutting nozzles.
Figure 9:
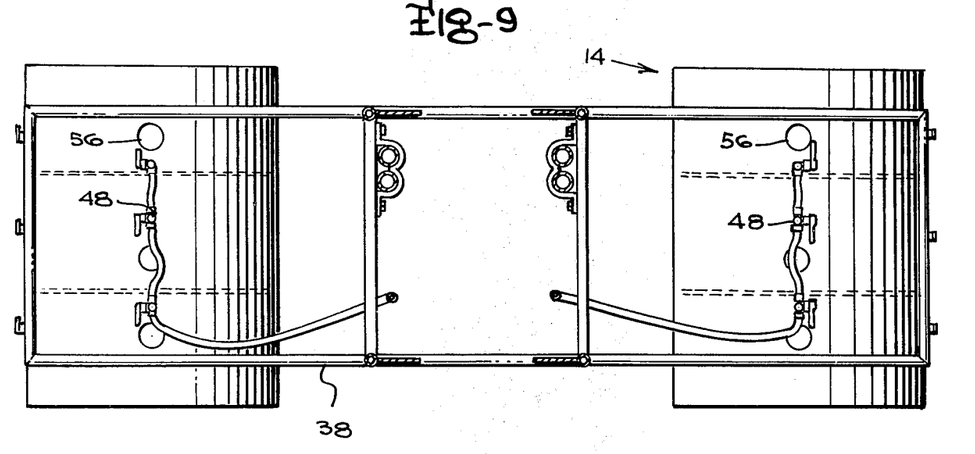
FIG. 9 is a cross-sectional view taken along lines 9—9 of FIG. 3 illustrating the under portion of the buoyancy tanks and the valves, inlets and outlets for the various compartments.

The eductor tube 82 includes a mouth 86 which is directed forwardly and inwardly to suck up the cuttings and other debris that are formed in the trench T by the cutting head. To provide the necessary suction, the upper end of the eductor tube 86 is provided with a venturi 88 as best shown in FIG. 6. The venturi is secured to the upper end 90 of the eductor tube 86. The venturi 88 is composed of a venturi housing 92 into which is positioned a nozzle 94 having an inlet 96 and a high pressure outlet 98. Water hoses 100 leading from each eductor are connected to the "Y" 102 and the eductor water supply hose 104. A single water hose 104 can supply sufficient water under pressure to each eductor tube. It has been found that water pressures from 200 psi to 800 psi are entirely adequate to provide the necessary suction to remove the cuttings.

The venturi housing 92 is provided with a discharge tube 106 which directs the debris and cuttings outwardly in the direction shown by the arrows. The venturi effect at the high pressure has been found to provide completely adequate suction from the mouth 86 of eductor tube 82 sufficient to break up and pass cuttings outwardly through the discharge outlet 106. The axes of the discharge outlet 106 and the mouth 86 preferably lie in the same vertical plane which is at approximately a 45° angle to the axis of the pipeline. The upward angle of the discharge outlet 106 is preferrably at an angle between 20°–40° to the horizontal in order to pass the material outwardly away from the apparatus.

PROPULSION SYSTEM

Figure 4:
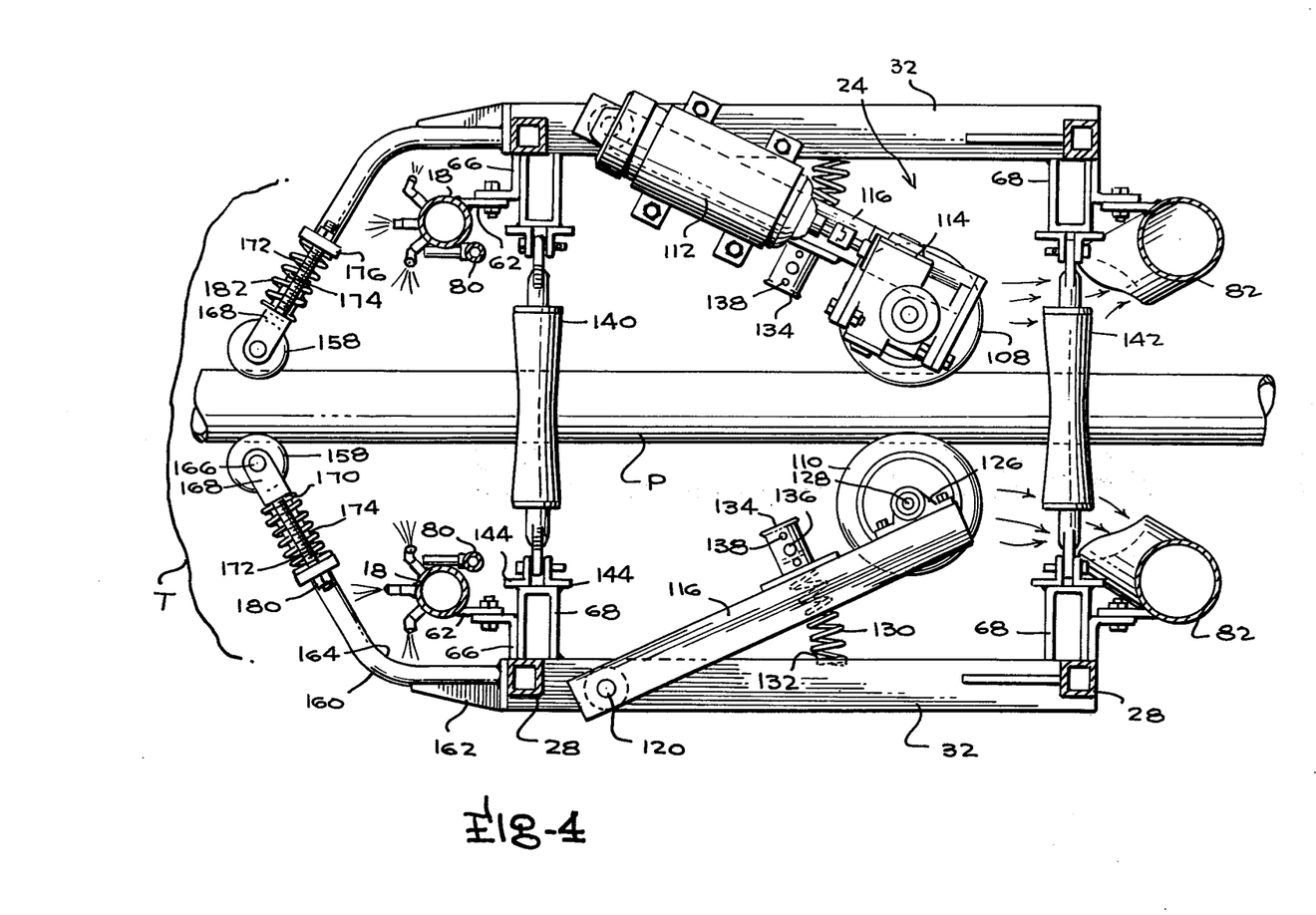
FIG. 4 is a cross-sectional view taken along lines 4—4 of FIG. 2 best illustrating the mounting of the drive rollers and their resilient backing and the forward guide rollers.

Essentially the sole propulsion for the apparatus 10 is derived from the drive rollers 24. As best illustrated in FIGS. 2 and 4 there is shown a single drive roller 108 and an idler roller 110. Both rollers or even additional rollers may be driven if desired. The drive for the roller 108 is achieved by means of electric motor 112 or other means, attached with suitable reduction gearing in gear box 114 to rotate drive roller 108 and by the frictional engagement of the pipe P to move the apparatus forwardly. The motor 112 may be an electric motor suitably waterproofed or may be fluidly operated.

Both the driven roller 108 and the idler roller 110 are mounted for rotation at the end of upper and lower arms 116 and 118 which are pivotally mounted at 120 by pivot pin 122 passing through the upper and lower arms 116 and 118 and lower longitudinal member 32. Suitable bearing surfaces 124 are provided between the arms 116 and 118 and the lower longitudinal member 32 as shown in FIG. 4. The rollers 108 and 110 are securely mounted at the ends of upper and lower arms 116 and 118 by bearing plates 126 provided therein with suitable bearings 128.

One of the important features of the present invention is the resilient means 130 that may be in the form of springs as shown but could similarly be a fluid-actuated shock absorber or any other resilient means. As shown, the spring 130 is welded at 132 to the inner side of the lower longitudinal member 32. The resilient member 130 extends inwardly towards the pipeline P and is received into the cup 134 having an adjustable bottom formed by means of the pin 136 passed through one of the holes 138 used to adjust the depth of the cup 134. Thus, the amount of pressure provided by the rollers 108 and 110 upon the pipe P may be simple adjusted in accordance with the pipe diameter or other purposes.

GUIDANCE SYSTEM

Figure 5:
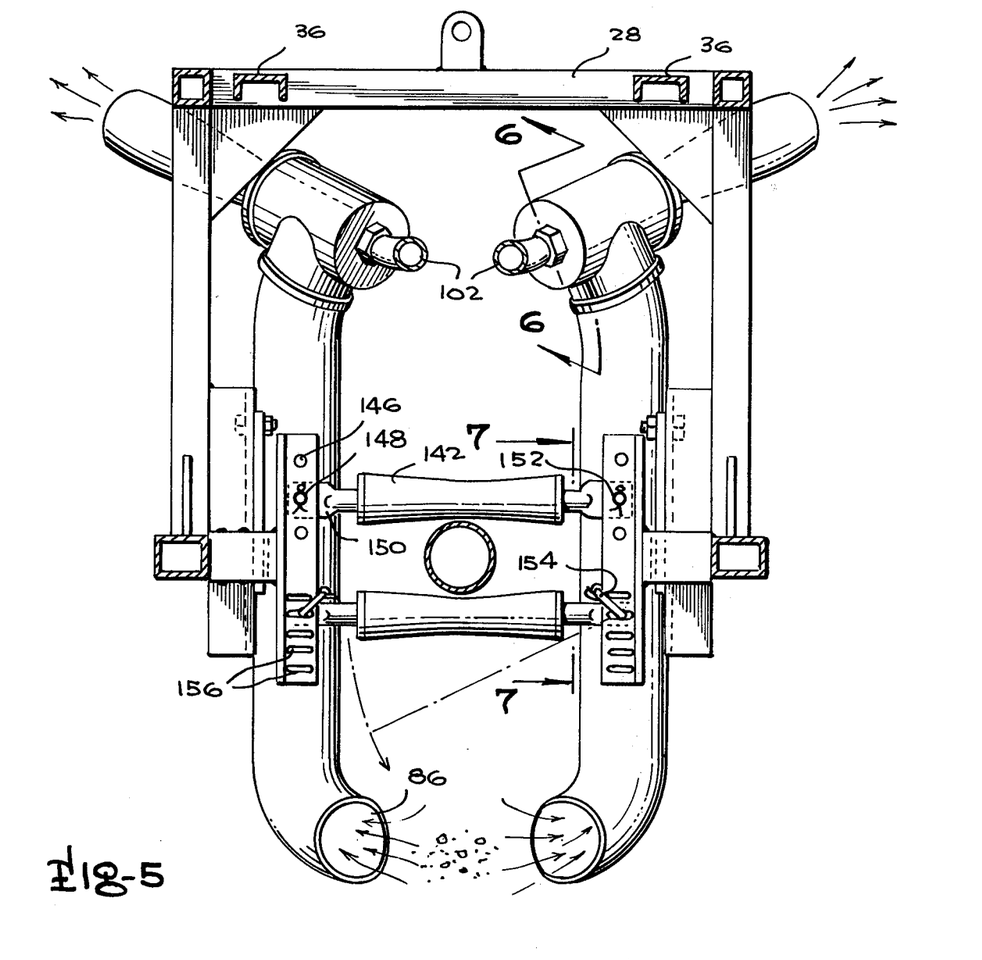
FIG. 5 is a cross-sectional view taken along lines 5—5 of FIG. 2 illustrating the elongated rollers and the shear pin connection for supporting the apparatus on the pipeline and the eductor means mounted on the frame.

The apparatus is guided basically by at least four pairs of rollers. The drive roller means 24, the forward guide roller means 26, and fore and aft elongated roller means 140 and 142 each of which is composed of an upper and lower roller as best seen in FIGS. 4 and 5. The elongated rollers 140 and 142 are not generally in contact with the pipeline and thus permit some sideways movement of the apparatus relative to the pipeline P. The angle of the surface of the roller is inclined as shown in the drawing to be of narrow diameter towards the center and tapering outwardly in greater diameter to the end of the roller. The pipeline is generally centered laterally along each roller and spaced therefrom a distance to conform to the expected irregularities on the pipeline circumference. Each pair of rollers 140 and 142 are mounted between vertically positioned angle irons 144 which are welded to U-shaped channel 68 as can be seem from FIGS. 4 and 5. Each of the pairs of channel irons are provided at the upper end with suitable complementary openings 146 to receive an appropriately sized pin 148 passing through the angle iron 144 and the end 150 of the axis of the roller. A cotter pin 152 or other suitable security means may be provided to prevent undersired removal of the pin 148 or loosening of the roller. The lower rollers of the fore and aft pairs of rollers 140 and 142 are secured in similar fashion but with the use of shear pin means 154 shown for illustration as a bent and tied rod passing through the elongated slots 156 at the lower portion of the angle irons 144. It is manifest that the plurality of openings 146 in the upper portion of the angle irons 144 and the plurality of slots 156 in the lower portion permit adjustment of the space between the rollers to accommodate different diameter pipes.

The upper rollers of the pairs of rollers 140 and 142 are pinned and secured prior to the apparatus being set into the water and over the pipe P. The bottom rollers are installed by a diver after the apparatus is lowered astride the pipeline with the upper rollers resting on the top of the pipeline. By use of the shear pin 154 the pin will shear in the event that any inadvertent upward force is placed upon the apparatus thus releasing the apparatus from the pipeline before the pipeline can be lifted or any damage occurs to the pipeline or its protective coating.

Forward guide roller means 26 are an important part of the guidance system. These forward guide rollers are composed of individual rollers 158 disposed on each side of the pipeline P to be in rolling contact with the pipeline in advance of the jet means 18.

As best shown in FIG. 4 the rollers 158 are mounted for rotation at the end of the curved extension arm 160 which is welded or otherwise secured to the frame 20 slightly forwardly of the pivot 120. Web 162 reinforces the mounting of the extension arm 160 on the frame. The arm 160 extends parallel to the pipeline and then bends inwardly sharply at 164 towards the pipeline.

The particular shape of the extension arm 160 is not critical however the curvature of the arm is designed to minimize the possibility of the arm contacting the side of the trench not yet fully cut away.

The rollers 158 are mounted for rotation about axis 166 by means of U-shaped brackets 168 having suitable openings in their legs to receive the axis 166 of the rollers 158. Secured to the back 170 of the bracket 168 are a pair of threaded rods 172 which protrude perpendicularly and on each side of the back 170 of the bracket 168. Between the rods 172 is positioned a hollow elongated tube 174 which extends between and parallel to the rods 172 but only up to between one-half and two-thirds of the length of the rods 172. Received into the tube 174 in a telescopic fashion is the end of the extension arm 160. To guide the rods 172 a backing plate 176 is welded onto and towards the end of the arm 160. The backing plate should be one-half the length of the tube 174 away from the end of the arm 160 so that it may protrude from the underside of the backing plate 176 into the tube 174. This relationship provides proper telescopic guidance between the U-bracket 168 and its roller with the extension arm 160 and the backing plate 176. Suitable openings 178 are provided in the backing plate to the side of the extension arm 160 to freely receive the rods 172. The openings 178 are of a diameter substantially larger than the rods 172 to permit free movement. The rods are held for slidable movement in the backing plate 176 by suitable nuts 180.

To resiliently urge the U-shaped bracket 168 and its roller 158 towards the pipe resilient means in the form of spring 182 is provided to surround both the tube 174 and the end of the extension arm 160. It can be seen that pressure against one of the rollers 158 will compress spring 182. The rods 172 will pass through the openings 178 in the backing plate. Movement may continue until the leading edge of the tube 174 bottoms out on the facing surface of the backing plate 176. Any further force applied onto the roller will be transmitted through the backing plate 176 and the extension arm 160 to torque the apparatus. The resilient mounting of the guide rollers 158 enables the forward guide roller means to pass over irregularities in the circumference of the pipeline in a manner similar to the spring urged mounting of the drive roller means 24.

The forward guide roller means 26 including the rollers 158 are positioned in front of the jet means 18 at a distance sufficiently ahead of the apparatus such that the jet nozzles 74 particularly those positioned above the forward guide roller means 26 are able to clear a path in front of the rollers 158 as shown by the initial trench line T in FIG. 4. In this manner the rollers will not be bogged down in contact with the mud. The first 6 inches or so of the bottom formation are usually found to be quite soft and hence it is a simple matter for the upper jet nozzles 74 to clear a shallow trench as a path for these rollers prior to the advance of the apparatus.

The importance of the forward guide roller means 26 extending as far out in front of the jet means 18 as shown enables the rollers 158 to be sensitive to curvatures in the pipeline P. For instance, if the pipeline P curves to one side the roller on that side will compress the spring 172 until the tube 174 bottoms out on the back plate 176. Further force received by the roller 158 due to the curvature will apply force through extension arm 160 to the apparatus. In view of the fact that the extension arm 160 is mounted on the frame 20 forwardly of the pivot 120 of the roller arms 116 and 118 there is a torque applied to shift the forward end of the apparatus 10 in the direction of the curve and the aft end of the apparatus away from the curve thus shifting the direction of the jet means 18 promptly to follow pipe curvatures. All curvatures of the pipeline P can be readily and quickly detected to shift apparatus and most importantly the jet means to follow the centerline of the pipeline before the trench has been cut.

The forward guide roller means 26 also act as bumpers to detect any obstruction to the forward motion of the apparatus. Should any object of sufficient size or position stop the apparatus along the path of the pipeline the object will hit the forward rollers and stop the apparatus prior to following the jet means 18 or other part of the apparatus 10. In the effort to continue to move the apparatus down the pipeline the electric motor 112 will draw greater current in a manner characteristic of electric motors until the drive roller 108 loses traction against the side of the pipeline. An automatic alarm or shut-off system (not shown) may be incorporated on the barge S to detect increases in the normal current draw at any particular voltage and automatically shut off the motor to permit the diver to inspect the cause of the greater current draw. Similarly, should any object become fouled in the apparatus so that the object may be hindering the progress of the apparatus as by dragging in the mud or along the pipeline, the current drawn by the motor 112 will again increase thus activating the alarm to shut off the system.

It should be manifest that the apparatus can be quickly and easily set up for self-propelled motion and left unattended. The buoyancy from tanks 16 would be adjusted to product minimum pressure upon the pipeline from the weight of the apparatus. The drive roller means 24 will move the apparatus along the pipeline until some fouling occurs. Only if there is an increase in the current drawn by the motor 112, or an increase in air pressure required if an air motor is used, would there be a need for the inspection by the diver. Otherwise, the apparatus may continue in the normal course unattended.

BUOYANT HOSE BUNDLE

The hoses 12 connected from the ship and passed down to the apparatus 10 require at least one water hose and one air hose. Usually, in the practice of this invention separate water hoses 72 are provided, one each for the cutting heads 60 and a separate water hose 104 provided to supply the water to the eductor means 22. The air hose 54 supplied the necessary air to the header 52.

The air hose 54, for air supplying purposes, need not be as large in diameter as the water hoses since the air pressure is usually only in the range of 100-300 psi as compared to the water hose pressure which is usually well above such pressures. If the air hose is tied to the water hoses 72 and 104 to form a bundle and the air hose 54 is of sufficient size to float all the hoses as shown in FIG. 1 there is no need to utilize the usual buoy or crane to hold the bundles upwardly. The size of an air hose in relationship to the sizes of the water hoses depends upon the number of water hoses in the hose bundle. The only requirement is that the air hose be of sufficient size to make the hose bundle buoyant.

As examples of the air hose diameter, one 4 inches in diameter air hose will provide sufficient buoyant force to float three high pressure water hoses of up to 2½ inches in diameter.

Even if the apparatus moves to a greater or lower depth no undue upward force will be imparted to the apparatus and it may be able to continue along the pipeline. It is also important with the buoyant hose bundle produced by an oversized air hose 54 that the position of the hoses can be readily detached from the ship S so that the position of the apparatus 10 will always be known.

In the event of bad weather it is a simple matter to disconnect the hoses and let them fall to the bottom. With the conventional buoy or crane method of supporting the buoyant hoses the buoy or crane would have to be disconnected first from the hoses or else the diver would have to descend to disconnect the hoses from the apparatus. Through the simple expediency of disconnecting the hoses at the barge the air hose will no longer be buoyant and the hoses will immediately fall without any loss of time and with complete safety to the apparatus during the storm. When the weather clears the hose ends are retrieved and reconnected to the manifold on the ship and the trench continues.

I claim:

1. An underwater trenching apparatus for burying pipeline and the like beneath the bottom of a body of water comprising:
    a frame for positioning over the pipeline to be buried,
    jet means carried by the forward end of said frame, to dig a trench for the pipeline,
    power means to move said apparatus along said pipeline,
    said power means being mounted on said frame for contact with said pipeline,
    guide means for sensing the direction of the pipeline in front of said apparatus and applying a torque for correcting the alignment of said apparatus, said guide means being secured to said frame forwardly of said power means,
    whereby upon said guide means sensing a preselected magnitude of change in pipeline direction relative to the axis of said apparatus, a torque is applied to said apparatus to align the apparatus with said pipeline.

2. The apparatus of claim 1 wherein said guide means includes sensing means in rolling contact with said pipeline, control means to translate an impulse of preselected magnitude from said sensing means into a force to torque the apparatus.

3. The apparatus of claim 2 including said guide means being secured to said frame forwardly of the mounting of said power means.

4. The apparatus of claim 1 wherein said guide means includes at least one roller means contacting the pipeline, abutment means mounted between said frame and said roller means to transmit a torque to said frame from a force from rearward movement of said roller means, and resilient means positioned between said roller means and said abutment means.

5. The apparatus of claim 4 including yoke means mounting said roller means for selected movement toward and away from said frame, said guide means including an arm extending from said frame forwardly of said jet means and mounting said roller means.

6. The apparatus of claim 5 including stop limit means limiting the movement of said roller means upon contact with said abutment means.

7. The apparatus of claim 1 said guide means including an arm extending forwardly from said frame from said jet means, a yoke means carried by said arm, roller means mounted within said yoke for contact with said pipeline to sense changes in direction of said pipeline relative to said apparatus, resilient means positioned between said arm and said yoke, stop limit means positioned between said roller means and said arm and abutment means to cooperate with said stop limit means, whereby upon selected movement of said roller means following changes in direction of said pipeline, said roller means forces said yoke to create contact between said abutment means and said stop limit means to torque the apparatus through said arm to a selected alignment with said pipeline.

8. The apparatus of claim 1 wherein said guide means includes a roller in contact with said pipeline.

9. The apparatus of claim 1 wherein said guide means includes a torque means extending forwardly from said frame to apply a torque to said frame.

10. The apparatus of claim 9 wherein said torque means includes an arm secured to said frame at one end and in contact with said pipeline at the other end.

11. The apparatus of claim 1 wherein said guide means includes at one end a roller for contact with said pipeline and an arm secured to the frame at the other end to torque said apparatus into alignment with said pipeline.

12. The apparatus of claim 1 wherein said guide means is mounted on said frame rearwardly of said jet means.

13. The apparatus of claim 1 wherein said guide means includes an arm mounted on said frame rearwardly of said jet means and forwardly of said power means.

14. The apparatus of claim 1 wherein said guide means includes a torque means secured to the frame at one end to torque the apparatus into alignment with said pipeline and a roller in contact with said pipeline.

15. The apparatus of claim 1 wherein said guide means includes a torque means secured to the frame at one end to torque the apparatus into alignment with said pipeline and a roller in contact with said pipeline, and wherein said guide means is mounted on said frame rearwardly of said jet means.

16. The apparatus of claim 1 wherein said guide means includes a torque means secured to the frame at one end to torque the apparatus into alignment with said pipeline and a roller in contact with said pipeline, and wherein said guide means includes an arm mounted on said frame rearwardly of said jet means and forwardly of said power means, and wherein said guide means is mounted on said frame rearwardly of said jet means.

17. The apparatus of claim 14 wherein said torque means includes an arm secured to said frame at one end and in contact with said pipeline at the other end.

18. The apparatus of claim 16 wherein said torque means includes an arm secured to said frame at one end and in contact with said pipeline at the other end.

* * * * *